June 2, 1942.  J. A. ROSEMAN  2,285,306
MOWER ATTACHMENT FOR TRACTORS
Filed Jan. 30, 1941  4 Sheets-Sheet 1

INVENTOR.
Joseph A. Roseman,
BY Offield Mellope Scott & Poele
Attys.

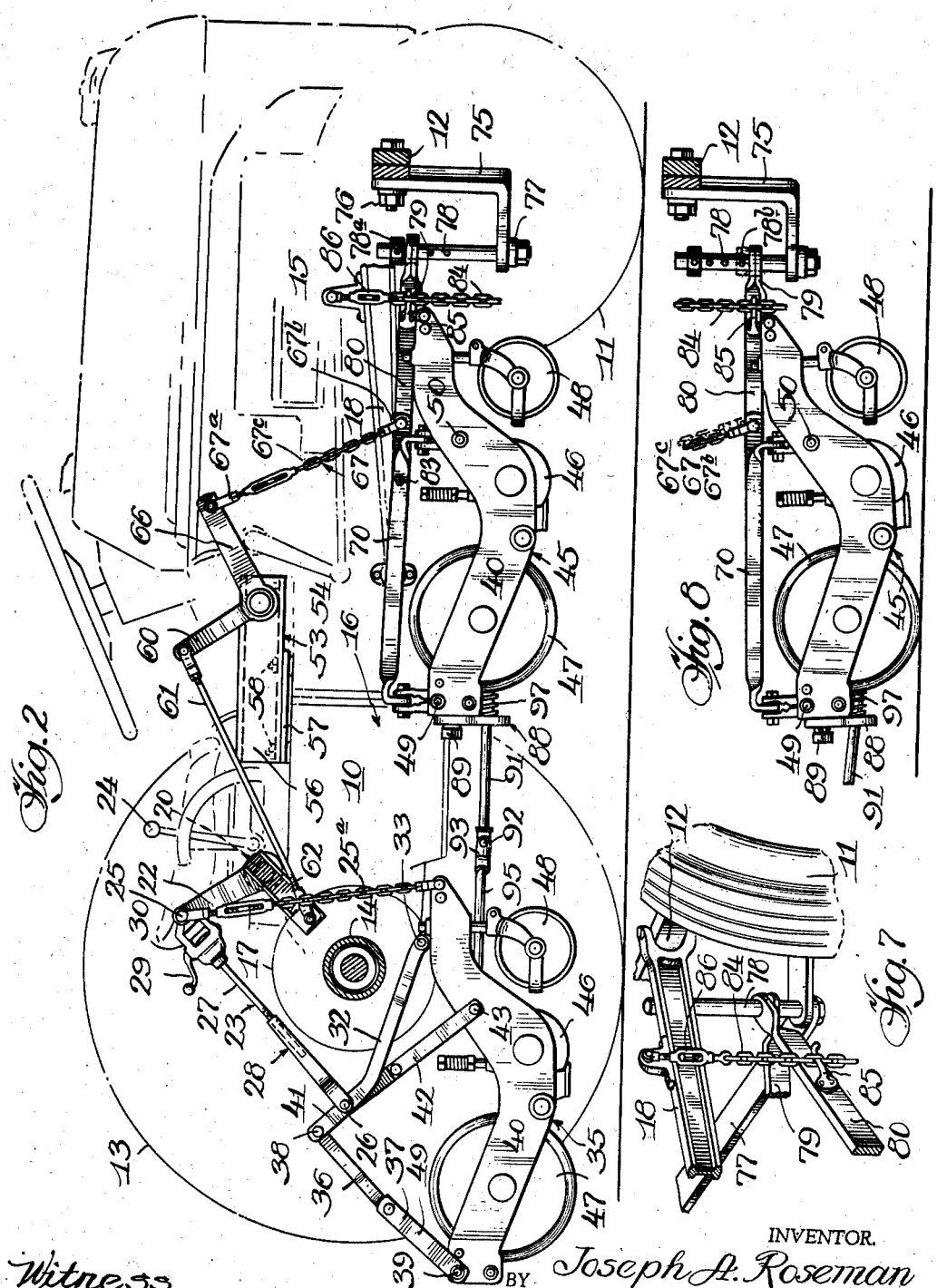

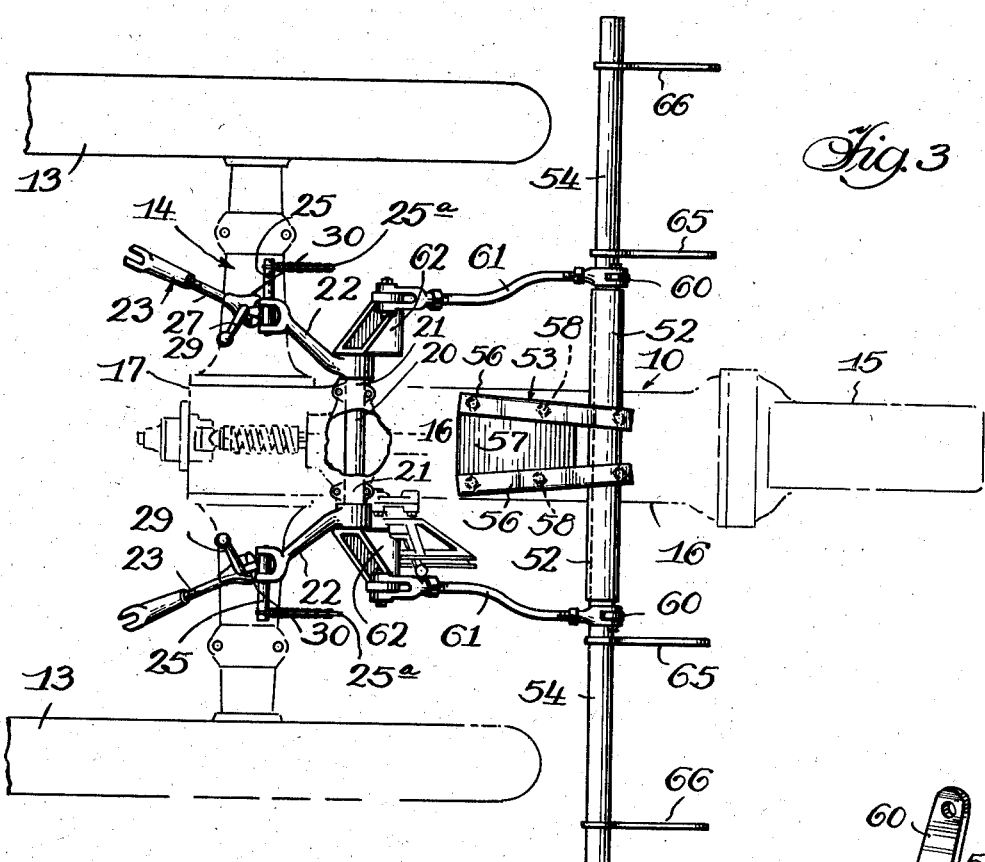
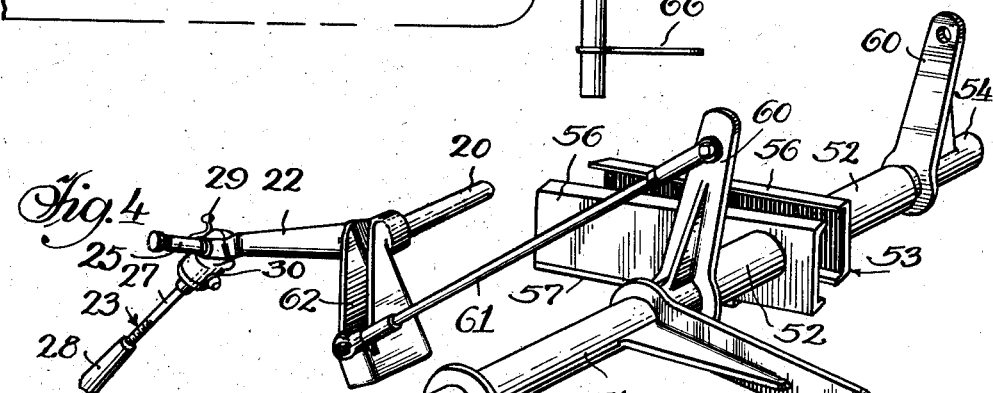
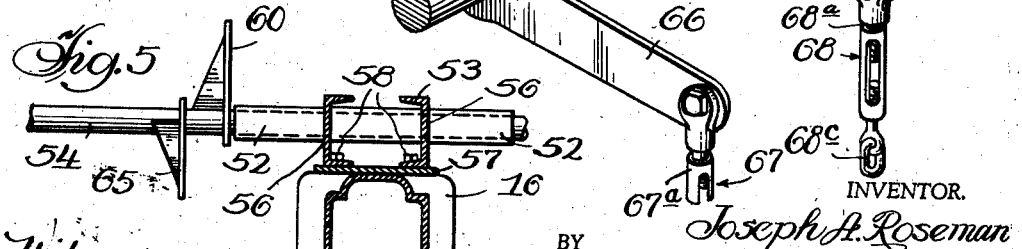

June 2, 1942. J. A. ROSEMAN 2,285,306
MOWER ATTACHMENT FOR TRACTORS
Filed Jan. 30, 1941 4 Sheets-Sheet 4

Patented June 2, 1942

2,285,306

UNITED STATES PATENT OFFICE 2,285,306

MOWER ATTACHMENT FOR TRACTORS

Joseph A. Roseman, Glenview, Ill.

Application January 30, 1941, Serial No. 376,594

8 Claims. (Cl. 56—7)

This invention relates to improvements in mower attachments for tractors, whereby a farm tractor of more or less conventional form and arrangement can be furnished with a plurality of mower units so as to be converted into a power gang mower which is relatively compact as to horizontal dimensions, and is especially adapted for maneuvering over uneven ground and for cutting irregular grass areas where gang mowers of the trailer type may be too large and unwieldy for efficient use.

In carrying out my invention I utilize a four-wheel farm tractor of conventional construction including relatively small steering wheels at the front end, and relatively large rubber tired traction wheels at the rear end. Certain such tractors have as standard equipment an elevating device adjacent its rear end operable at will by power from the motor, to raise or lower various types of cultivating implements that may be used with the tractor, or to maintain such implements at various adjusted heights relative to the ground. I employ this elevating device as a part of an attachment for adjustably supporting three mower units of conventional design. One of said mower units is suspended between the rear wheels with a portion therof extending forwardly beneath the rear axle, and the other two mower units are suspended at opposite sides of the main body of the tractor between the front and rear wheels in an especially compact arrangement, as will hereinafter more fully appear.

The invention may best be understood by reference to the accompanying drawings, in which Fig. 1 is a side view showing the principal parts of a farm tractor in outline, and showing the mower attachment in full lines with the mower units in lowered or cutting position.

Fig. 2 is a view similar to Fig. 1, but showing the mower units in elevated, or transporting position.

Fig. 3 is a detail plan view of the rear end of the machine with the mower units removed, showing the method of securing the attachment to the elevating mechanism of the tractor.

Fig. 4 is a fragmentary perspective view of the main parts of the attachment shown in Fig. 3.

Fig. 5 is a detail transverse section taken through the saddle of the attachment.

Fig. 7 is a detail perspective view of the draft bar height adjusting means for the front mower units.

Fig. 8 is a detail side view of the front mower unit illustrating the use of the elevating adjustment means.

Figure 1:
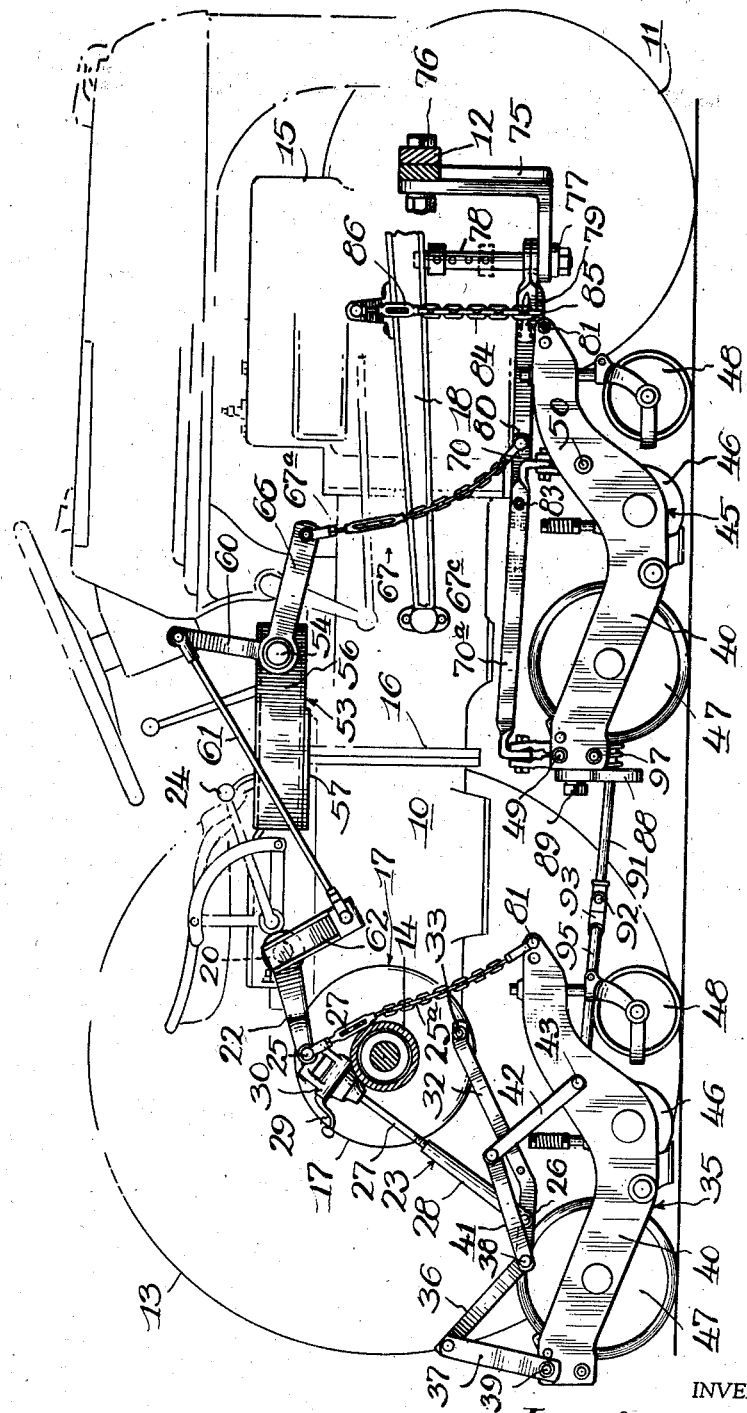

Referring now to details of the embodiment of my invention illustrated in the drawings, the tractor to which my mower attachment is applied is a standard Ford farm tractor, comprising a main frame 10, front wheels 11, 11 on front axle 12, and rear wheels 13, 13 on rear axle 14. In the conventional form of tractor shown herein, the main frame is made up of a motor unit 15, transmission casing 16, and differential housing 17 all connected together in alignment to form an elongated frame, as indicated in Figs. 1 and 3. The front axle is pivoted at its center to the front end of the motor unit, and a brace 18 extends forwardly at an angle from each side of the transmission housing to the outer end of said front axle (see Figs. 2 and 3).

Near the rear end of the main frame 10 above the transmission housing 17 is an elevating mechanism forming part of the so-called "Ferguson system" employed as standard equipment on the Ford tractor and disclosed in Patent No. 2,223,002 issued November 26, 1940. This mechanism includes a transverse shaft 20 supported in bearings 21, 21, with crank arms 22, 22 at opposite ends thereof arranged for arcuate swinging movement. Links 23, 23 on the ends of said arms are originally intended for detachable connection with various kinds of farm implements (not shown), such as a plow, cultivator, scraper or the like, so as to suspend or support said implements at various operating heights at the rear of the tractor. The shaft 20 is rotated as usual by suitable hydraulic mechanism contained in the casing 17, which operates said shaft in the usual manner. The hydraulic mechanism is manually controlled by a handle 24, which handle can be moved to fully lowered position, as shown in Fig. 1, or fully raised position, as shown in Fig. 2, or if desired, to any intermediate position at which the crank arms 22, 22 will be maintained indefinitely at a corresponding intermediate position so as to hold the devices supported by said crank arms at various adjusted heights relative to the ground. Further details of the hydraulic mechanism are not shown or described herein, as the structure and mode of operation of such mechanism is well known to those skilled in the art.

As usual, the supporting links 23, 23 forming part of the original equipment have means for adjusting their length, herein consisting of an upper section 27 threaded in a lower section 28, and rotated by a hand crank through bevel gears of the usual kind (not shown) in housing 30 at the upper end of each link.

Figure 6:
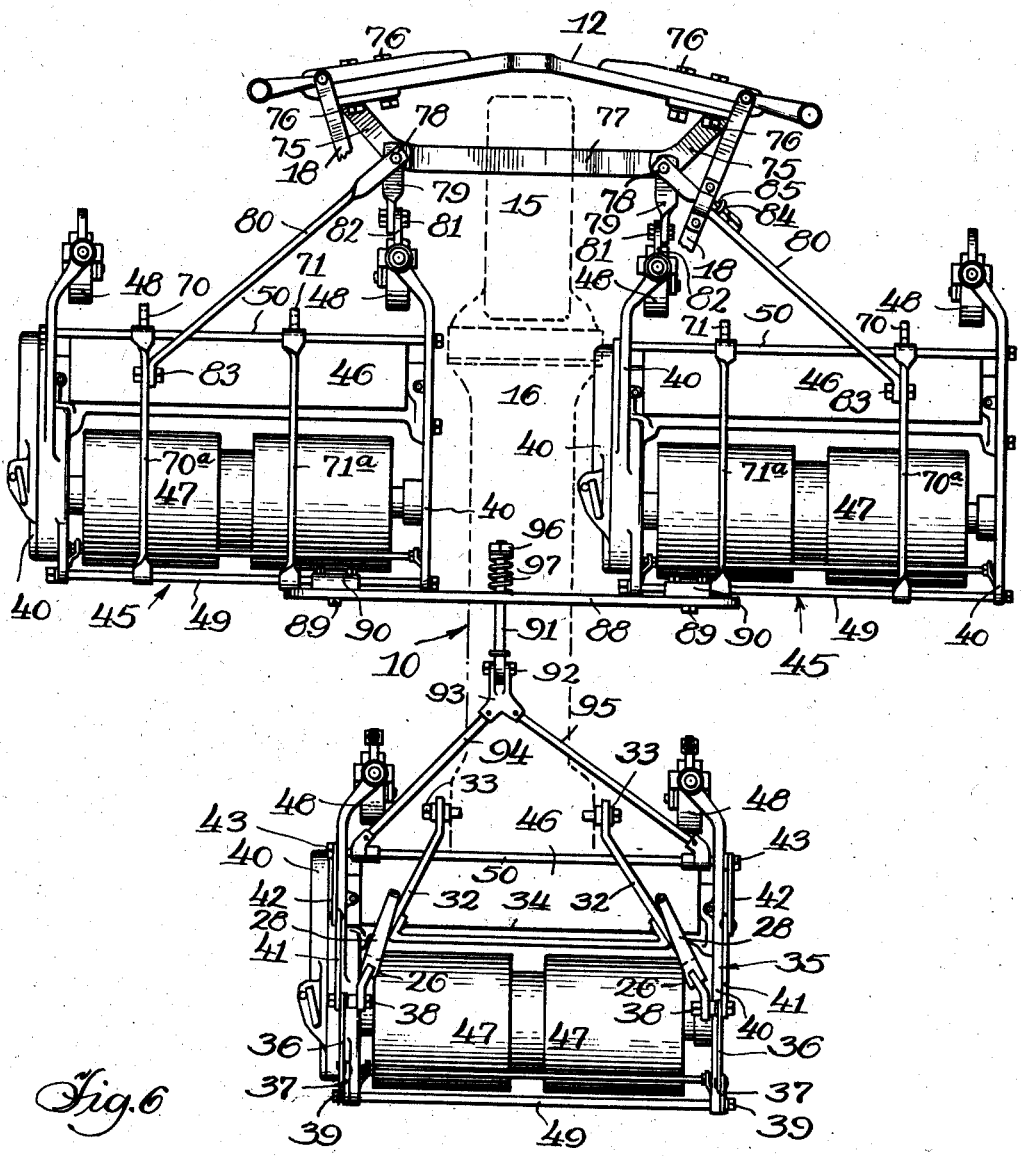
Fig. 6 is a plan view with most of the upper parts of the tractor and elevating attachment removed to show the arrangement of the mower units and details of their connection to the front axle of the tractor.

In applying my attachment to the tractor above described, I provide a pair of bars 32, 32 each pivoted on the frame 10, as by a bolt 33 at the side of the differential housing 17 below the rear axle, and with their free ends extending rearwardly at diverging angles, as shown in Fig. 6. A cross brace 34 connects said bars intermediate their ends. The links 23, 23 are pivotally connected adjacent the rear ends of said bars by pins 26.

Connected to a pivot pin 38 at the outer or rear ends of bars 32, 32 are a pair of hinged links 36, 37 extending to pivot pins 39, 39 at the rear end of each of the rear mower units indicated generally at 35. Similar hinged links 41, 42 connect said pivot pins 38 with pivots 43 near the front ends of the side frames 40, 40 of said mower unit.

I also provide each of the crank arms 22, 22 with extended pivot pins 25, 25 at their outer ends to each of which is connected an auxiliary supporting chain 25ª. Said supporting chains are extended downwardly in front of the rear axle 14 and are connected to the front ends of the adjacent side frame 40 of the rear mower unit 35. In the preferred form shown, the auxiliary supporting chains 25ª are shorter than the supporting linkage provided by links 36, 37 and 41, 42. In other words, when the crank arms 22, 22 are in fully lowered position shown in Fig. 1, with the mower unit resting in substantially horizontal cutting position on the ground, the chains 25ª, 25ª are practically taut, while the links 36, 37 and 41, 42, are partially collapsed. Accordingly, it will be observed that the initial lifting action through the crank arms 22, 22 will only effect elevation of the front end of the mower unit and cause the latter to be tilted upwardly at a substantial angle relative to the ground, before the links 36, 37 and 41, 42 become straightened into lifting position. However, when the crank arms 22, 22 approach fully elevated position shown in Fig. 2, it will be observed that the lifting action exerted on the front end of the mower unit 35 through the chains 25ª will be diminished due to the decreasing angular relation between said chains and their respective crank arms. As a result, when the crank arms 22, 22 reach their fully elevated position shown in Fig. 2, the entire mower unit will be suspended above the ground in substantially horizontal position, affording maximum clearance for transportation purposes.

The rear mower unit 35, as well as the two forward units 45, 45 are of conventional form heretofore used in gang mowers and may be described briefly as follows: A cutter reel 46 is mounted in front of a relatively heavy roller 47 and is driven by the latter through gearing housed as usual in the side frames 40. Each side frame may have a caster wheel 48 mounted at its front end, as usual. Cross bar 49 connects the side frames across the rear of the unit and a similar cross bar 50 connects said frames adjacent their front ends.

It will be especially observed that during the initial elevating movement of the mower unit 35 in which the front end thereof is first raised by the chains 25ª, 25ª, the drive roller 47 at the rear end of the mower unit remains in driving engagement with the ground. Thus by manipulating the control handle 24 into various intermediate positions, it will be understood that the mower unit can be maintained and operated at various adjusted cutting levels, with the mower frame supported at various inclinations to the ground. In such inclined positions the front caster wheel 48, of course, will not be in contact with the ground.

The front mower units 45 are also provided with means for elevation at various intermediate inclined cutting heights relative to the ground, operable simultaneously with the rear mower unit. In the form shown, the mechanism for accomplishing this purpose includes an outrigging at opposite sides of the frame 10 forwardly of the rear wheels consisting of a pair of laterally extending bearing members 52 carried by a saddle 53, and each having an extension arm 54 rotatably mounted therein (see Figs. 3, 4 and 5). The saddle 53 consists of two upright channel bars 56, 56 secured to a base plate 57 as by welding, and detachably secured as a unit to the top of the housing 16 of the tractor, as by bolts 58, 58. As shown herein, the bearing members 52 may be formed of a single length of tubing, passing through the channel bars 56, 56 and welded thereto.

Each of the extension arms 54 has a lever arm 60 mounted thereon adjacent the bearing member 52. Said lever arm is connected by link 61 to a lever 62 carried on the adjacent outer end of the rocking shaft 20. The lever 62 can be connected to the rocking shaft 20 in any suitable manner, as herein shown being welded to the outer face of the crank arm 22 at its point of connection to said shaft. Each extension arm 54 also has a pair of lifting levers 65, 66 connected thereto in laterally spaced relation, and herein being disposed approximately at a 90° angle to the lever arm 60. Said lifting levers have links indicated generally at 67 and 68 depending from their ends and connected to extensions 70, 71 at the front ends of longitudinally disposed supporting bars 70ª, 71ª, each of which is connected at opposite ends to the rear and front cross bars 49 and 50 of the front mower unit 45 disposed below said extension arm. In the form shown, the links 67 and 68 are similar, comprising upper and lower turnbuckles 67ª, 68ª and 67ᵇ, 68ᵇ connected by chains 67ᶜ, 68ᶜ, respectively.

It will be observed that the extensions 70 and 71 are disposed substantially in advance of the front ends of the lifting levers 65, 66 so as to exert a rearward as well as upward lifting action on the mower unit when the latter is raised by the lifting levers 65, 66. These two lifting levers at opposite sides of the machine will be operated simultaneously to raise or lower the front mower units 45, 45 with the rear mower unit 35.

The draft connections for the mower units also forming a part of the attachment comprise a pair of L-shaped brackets 75, 75 which are secured in depending and rearwardly extending position adjacent the outer ends of the front axle 12 as by bolts 76. The rear ends of these brackets are cross-connected by a brace 77 extending beneath the motor 15. An upright draft pin 78 is mounted at the junction of each bracket 75 and the end of the brace 77. Each draft pin 78 has two connecting bars 79 and 80 each loosely pivoted thereon and extending at a rearwardly diverging angle from each other and having suitable connection to the adjacent front mower unit 45 so as to permit horizontal swivelling movement of said mower unit. In the form shown, each draft bar 79 is connected by bolt 81 to a bracket 82 on the front end of the inner side frame member 40 of is respective mower unit while the bar 80 extends outwardly at an angle to the line of draft and is connected by bolt 83 near the front end of the outer supporting bar 70, as clearly shown in Fig. 6. The arrangement of the draft bars 79 and 80 is such that they may slide freely along the draft pin 78 in a vertical direction as the mower unit 45 is raised and lowered by the elevating mechanism.

Each of the draft pins 78 has a collar 78a adjustably mounted vertically thereon as by holes 78b, for receiving a removable pin, so as to limit the upward movement of the draft bars 79 and 80, as is best illustrated by comparison of Figs. 2 and 8. Under ordinary conditions the collar 78a is adjusted into position adjacent the upper end of the draft pin 78 as shown in Fig. 2, so that when the lifting levers 65, 66 are operated to lift the front ends of mower unit 45, the draft bars 79 and 80 will slide upwardly along the draft pin 78, while the drive roller 47 of the mower unit remains in driving engagement with the ground, until the draft bars 79 and 80 engage the collar 78a so as to restrain further lifting movement of the front end of the mower unit. Thereafter the lifting front of the levers 66, 67 will operate to elevate the rear end of the mower unit until finally the unit will be entirely suspended in substantially horizontal position with maximum clearance above the ground, for transportation purposes, as shown in Fig. 2.

It will now be understood that by setting the control lever 24 of the hydraulic lift mechanism at any predetermined intermediate position in which the drive roller 47 will remain in engagement with the ground, the front mower units can be adjusted to cut at a height determined by the inclined angle at which it is supported and maintained. The cutting height of the front mowers can therefore be adjusted and maintained at substantially the same height as that of the rear mower unit 35, as previously described.

It will be observed further that the use of the caster wheels 48 on the mower units 35 and 45 is optional, and that such caster wheels may be dispensed with if desired, relying solely upon the vertical adjustment of cutting height afforded by manipulation of the control handle 24 of the hydraulic elevating mechanism.

Under some conditions it may be desired to provide a definite limit for the vertical cutting height for the front mower units 45. This is accomplished by adjusting the height of the collar 78a to a lower position on the draft pin 78, as indicated in dotted lines in Fig. 8.

Means are also provided for limitng the extent of downward movement of the draft bars 79 and 80 along the draft pin 78. For this purpose a chain 84 is mounted on the front axle brace 18 of the tractor with its lower end in position to engage a hook 85 mounted at one side of the draft bar 80. By inserting a hook 85 in the proper link of chain 84, the draft bars 79 and 80 will be supported at an intermediate level as indicated in Figs. 7 and 8, thus maintaining the front mower unit at a predetermined cutting height relative to the ground without relying upon the hydraulic lift mechanism for this purpose.

The draft connections to the rear mower unit 35 consist of a transverse bar 88 which is pivotally connected between the adjacent rear ends of the two front mower units 45 by bolts 89, 89 secured to brackets 90, 90 mounted, respectively, on the rear cross bars 49, 49 of said mower units, as indicated in Fig. 6. A longitudinal draft rod 91 extends loosely through the cross bar 88 adjacent its center and is pivotally connected by bolt 92 to a bracket 93 having a pair of diverging bars 94, 95 pivotally connected at their outer ends to the front cross bar 50 of the rear mower unit 35. The draft bar 91 has a bolt 96 on its front end, and a spring 97 is inserted between the bolt 96 and the front face of the cross bar 88 so as to provide a cushioned draft connection for the shaft bar 91.

It will be observed that the draft connections for the mower units are independent of the lifting mechanism, and include connections freely movable vertically so as to afford flexibility of vertical movement of the mower units so as to provide a substantially horizontal pull on the front ends of said mower units in all positions of vertical adjustment thereof. Thus, the lifting mechanism can be readily operated both for adjusting the cutting height of the mower units, or for suspending the latter wholly above the ground when desired.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. A mower attachment for a wheeled tractor having a power lift mechanism for implements adjacent the rear end thereof, said attachment comprising means connected to said power lift mechanism and arranged to support a rear mower unit between the rear wheels of said tractor, and auxiliary supporting means connected to said tractor including supporting arms extending laterally at opposite sides thereof, each having means thereon arranged to support a front mower unit forwardly of the rear wheel, and operatively connected to said power lift mechanism whereby all of said mower units are lifted and lowered simultaneously, said mower supporting means being arranged to tilt their respective mower units simultaneously at similar varying angles while the latter are in driving engagement with the ground, so as to support said mower units at varying cutting heights, and draft means on said tractor including vertically movable connections freely adjustable to provide substantially horizontal pull on said mower units in all positions of tilted adjustment thereof.

2. A mower attachment for a wheeled tractor having a power lift mechanism for implements adjacent the rear end thereof, said attachment comprising means connected to said power lift mechanism and arranged to support a rear mower unit between the rear wheels of said tractor, and auxiliary supporting means connected to said tractor including supporting arms extending laterally at opposite sides thereof, each having means thereon arranged to support a front mower unit forwardly of the rear wheel, and operatively connected to said power lift mechanism whereby all of said mower units are lifted and lowered simultaneously, draft means on said tractor including vertically movable connections freely adjustable to provide substantially horizontal pull on said mower units in all positions of vertical adjustment thereof, said mower supporting means and draft connections being arranged to tilt their respective mower units simultaneously at similar varying angles while the latter are in driving engagement with the ground, so as to vary the cutting height thereof and to support said mower units in substantially horizontal position when they are bodily elevated into transporting position above the ground.

3. A mower attachment for a wheeled tractor having a power lift mechanism for supporting implements at varying predetermined levels adjacent the rear end thereof, said attachment comprising three mower units each having a cutter reel, and drive roller therefor at the rear thereof, means connected to said power lift mechanism for supporting one of said mower units between the rear wheels of said tractor, and auxiliary supporting means connected to the tractor including supporting arms extending laterally at opposite sides thereof, each having means thereon for supporting a mower unit forwardly of the rear wheels, and operatively connected to said power lift mechanism whereby all of said mower units may be lifted and lowered simultaneously, with said mower units supported in tilted position with their respective drive rollers in driving engagement with the ground so as to cut at varying heights from the ground.

4. A mower attachment for a wheeled tractor having a power lift mechanism including a rocking member for supporting implements at varying predetermined levels adjacent the rear end thereof, said attachment comprising three mower units each having a cutter reel, and drive roller therefor at the rear thereof, lever and linkage means detachably connectible to said rocking arm for supporting one of said mower units between the rear wheels of said tractor, and auxiliary supporting means detachably connected to the tractor including supporting arms extending laterally at opposite sides thereof, each having lever and linkage means thereon for supporting a mower unit forwardly of the rear wheels, and operatively connected to said rocking arm by linkage means whereby all of said mower units are lifted and lowered simultaneously, all of said lever and linkage means being arranged to effect initial elevation of the front end of their respective mower units so as to tilt the latter simultaneously at similar varying angles while their drive rollers are in driving engagement with the ground, whereby said mowers may be maintained at varying predetermined cutting levels under the single control of said power lift mechanism.

5. A mower attachment for a wheeled tractor having a power lift mechanism for implements adjacent the rear end thereof including a pair of rocking arms, said attachment comprising a pair of links detachably connectible to said rocking arms and flexibly connected to opposite ends of a mower unit so as to support the latter between the rear wheels of said tractor, an auxiliary support detachably connectible to said tractor forwardly of said power lift mechanism and having axially rotatable supporting arms extending laterally at opposite sides thereof, each of said supporting arms having a plurality of lever arms thereon, and link means connecting each pair of said lever arms with a mower unit so as to support the latter forwardly of the rear wheels of said tractor, and means operatively connecting the rocking arms of said power lift mechanism with each of said axially rotatable supporting arms so as to lift and lower all of said mower units simultaneously.

6. A mower attachment for a wheeled tractor having a power lift mechanism for implements adjacent the rear end thereof, said attachment comprising means supporting opposite sides of a rear mower unit and detachably connectible to said power lift mechanism so as to support said rear mower unit between the rear wheels of said tractor, and auxiliary supporting means detachably connectible to said tractor including supporting arms extending laterally at opposite sides thereof, each having a pair of rocking levers thereon forwardly of each rear wheel, means flexibly supporting a front mower unit from each pair of rocking levers, means connectible to said power lift mechanism for moving said rocking arms so as to lift and lower all of said mower units simultaneously, and means on the tractor affording vertically movable draft connection with the mower units disposed forwardly of the rear wheels independent of the auxiliary supporting means, and a draft connection between the rear ends of said last named mower units and the single mower unit between the rear wheels of the tractor.

7. A mower attachment for a wheeled tractor having a power lift mechanism for implements adjacent the rear end thereof, said attachment comprising means supporting opposite sides of a rear mower unit and detachably connectible to said power lift mechanism so as to support said rear mower unit between the rear wheels of said tractor, and auxiliary supporting means detachably connectible to said tractor including means supporting opposite ends of two front mower units in advance of said rear wheels and also detachably connectible to said power lift mechanism so as to lift or lower all of said mower units simultaneously, and draft means for raid mower units independent of said supporting means having swiveling and vertically movable connection to each of said front mower units, a spacer bar pivotally connected between the rear ends of said front mower units, and a draft bar having swivelling connection between said spacer bar and said rear mower unit.

8. A mower attachment for a wheeled tractor having a power lift mechanism for implements adjacent the rear end thereof, said attachment comprising means supporting opposite sides of a rear mower unit and detachably connectible to said power lift mechanism so as to support said rear mower unit between the rear wheels of said tractor, and auxiliary supporting means detachably connectible to said tractor including means supporting opposite ends of two front mower units in advance of said rear wheels and also detachably connectible to said power lift mechanism so as to lift or lower all of said mower units simultaneously, and draft means for said mower units independent of said supporting means including a pair of brackets each having an upright draft rod permitting swivelling connection to said front mower units respectively at various positions of vertical adjustment of the latter, a spacer bar pivotally connected between the rear ends of said front mower units, and a draft bar having swivelling connection between said spacer bar and said rear mower unit.

JOSEPH A. ROSEMAN.